(12) United States Patent
Marino

(10) Patent No.: US 8,978,058 B2
(45) Date of Patent: Mar. 10, 2015

(54) METHODS AND APPARATUS FOR MANAGING INTERFACES IN A PLACESHIFTING DEVICE

(71) Applicant: Sling Media Inc., Foster City, CA (US)

(72) Inventor: Nino Marino, Alameda, CA (US)

(73) Assignee: Sling Media, Inc., Foster City, CA (US)

( * ) Notice: Subject to any disclaimer, the term of this patent is extended or adjusted under 35 U.S.C. 154(b) by 0 days.

(21) Appl. No.: 14/053,855

(22) Filed: Oct. 15, 2013

(65) Prior Publication Data
US 2014/0143798 A1    May 22, 2014

Related U.S. Application Data

(60) Provisional application No. 61/713,237, filed on Oct. 12, 2012.

(51) Int. Cl.
| | |
|---|---|
| *H04N 7/16* | (2011.01) |
| *H04N 21/4408* | (2011.01) |
| *H04N 21/432* | (2011.01) |
| *H04N 21/436* | (2011.01) |
| *H04N 21/4363* | (2011.01) |
| *H04N 21/4627* | (2011.01) |

(52) U.S. Cl.
CPC ....... *H04N 21/4408* (2013.01); *H04N 21/4325* (2013.01); *H04N 21/43615* (2013.01); *H04N 21/43635* (2013.01); *H04N 21/4627* (2013.01)
USPC ................................ 725/31; 725/93; 725/94

(58) Field of Classification Search
None
See application file for complete search history.

(56) References Cited

U.S. PATENT DOCUMENTS

| | | | | |
|---|---|---|---|---|
| 5,550,863 | A * | 8/1996 | Yurt et al. ...................... | 375/240 |
| 6,381,747 | B1 * | 4/2002 | Wonfor et al. ................ | 725/104 |
| 6,973,621 | B2 * | 12/2005 | Sie et al. ........................ | 715/720 |
| 7,779,439 | B2 * | 8/2010 | Sie et al. ......................... | 725/34 |
| 7,895,637 | B2 * | 2/2011 | Cha ................................ | 725/152 |
| 7,900,237 | B2 * | 3/2011 | Kwon et al. ................... | 725/139 |
| 8,713,316 | B2 * | 4/2014 | Velasco et al. ................ | 713/168 |
| 2009/0193266 | A1 * | 7/2009 | Gable et al. ................... | 713/193 |
| 2010/0071076 | A1 * | 3/2010 | Gangotri et al. ................ | 726/32 |

(Continued)

OTHER PUBLICATIONS

European Patent Office, International Searching Authority, International Search Report and Written Opinion for International Application No. PCT/US2013/064941, mailed Jan. 3, 2014.

(Continued)

*Primary Examiner* — Fernando Alcon
(74) *Attorney, Agent, or Firm* — Ingrassia Fisher & Lorenz, P.C.

(57) ABSTRACT

A placeshifting device handles content from a media source (e.g., a set-top box) that might incorporate a form of copy-protection such as HDCP. In one case, when a placeshifting mode is entered (as opposed to a pass-through mode), the copy-protection capability of the interface (e.g., an HDMI interface) is simply disabled. In another case in which the media source includes a copy protection "flag" or the like that can be interrogated by the placeshifting device, the placeshifting device determines whether the media source copy-protection is enabled, and only then disables the copy-protection capability of the interface. In another case in which selectable output control (SOC) is available in the media source, the placeshifting device determines whether alternate interfaces are available (e.g., component video, composite video, and the like), and if so, disables the interface having copy-protection capability.

17 Claims, 3 Drawing Sheets

(56) References Cited

U.S. PATENT DOCUMENTS

Figure 1:
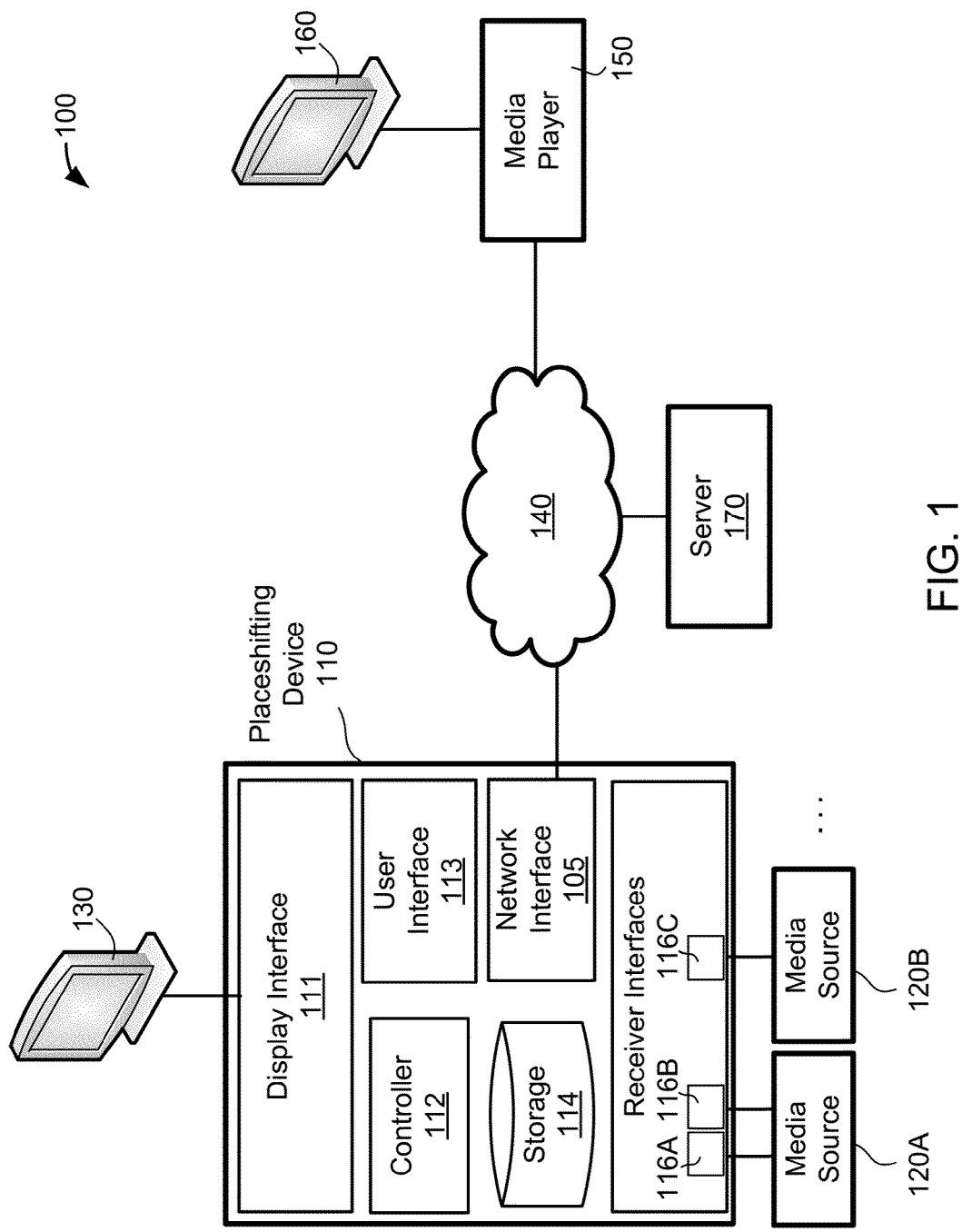

| | | | |
|---|---|---|---|
| 2011/0113442 A1* | 5/2011 | Kikkawa | 725/25 |
| 2011/0131619 A1* | 6/2011 | Hasek et al. | 725/93 |
| 2012/0159534 A1* | 6/2012 | Quan et al. | 725/31 |
| 2013/0160148 A1* | 6/2013 | Gangotri et al. | 726/30 |
| 2013/0347044 A1* | 12/2013 | Lee et al. | 725/88 |

OTHER PUBLICATIONS

DVB Organization: "CIT008.pdf", DVB, Digital Video Broadcasting, C/O EBU—17A Ancienne Route—CH-1218 Grand Saconnex, Geneva—Switzerland, Feb. 24, 1998, XP017822141.

Zohar Etzioni et al: "Inter-HAN service interoperability with Krox", Consumer Electronics (ICCE), 2012 IEEE International Conference on, IEEE, Jan. 13, 2012, pp. 441-444, XP032124959, DOI: 10.1109/ICCE.2012.6161935 ISBN: 978-1-4577-0230-3 Section "UPnP Plug-in" Figure 3.

DVB Organization: "tm-cpt0714.pdf", DVB, Digital Video Broadcasting, C/O EBU—17A Ancienne Route—CH-1218 Grand Saconnex, Geneva—Switzerland, Jul. 14, 2011, XP017836248, Section 4.5 Smartright Personal Private Network.

Zohar Etzioni et al: "Federated homes: Secure sharing of home services", Consumer Communications and Networking Conference (CCNC), 2011 IEEE, IEEE, Jan. 9, 2011, pp. 989-994, XP031866112, DOI: 10.1109/CCNC.2011.5766664 ISBN: 978-1-4244-8789-9.

\* cited by examiner

METHODS AND APPARATUS FOR MANAGING INTERFACES IN A PLACESHIFTING DEVICE

CROSS-REFERENCE TO RELATED APPLICATIONS

This application claims priority to U.S. Provisional Patent Application No. 61/713,237, filed Oct. 12, 2012, the entire contents of which are incorporated by reference herein.

TECHNICAL FIELD

The present disclosure generally relates to systems and techniques for processing media content such as television programming and movies within a home entertainment system. More particularly, the present disclosure relates to placeshifting devices configured to receive copy-protected content.

BACKGROUND

Recently, consumers have expressed significant interest in "place shifting" devices that allow viewing of television or other media content at locations other than their primary television set. Placeshifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

Some media content received by placeshifting devices incorporates one or more forms of copy-protection. For example, a particularly popular interface for viewing media content is the high-definition multimedia interface (HDMI), which is incorporated into many modern displays and entertainment devices. HDMI™ is often used in such devices in conjunction with high-bandwidth digital content protection (HDCP). Unfortunately, however, compliance with the applicable HDMI/HDCP licensing requirements (as well as technical safeguards) greatly limits the ability of an entertainment device to retransmit (e.g., placeshift) content protected by HDCP, even when that same content might have been legally placeshifted had it been received through another interface, such as component video or the like.

It is therefore desirable to provide systems and methods for improving the placeshifting experience of users having home entertainment devices utilizing an HDMI/HDCP interface in addition to other media interfaces. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and FIG. 1 is a conceptual overview of an exemplary placeshifting system.

Figure 2:
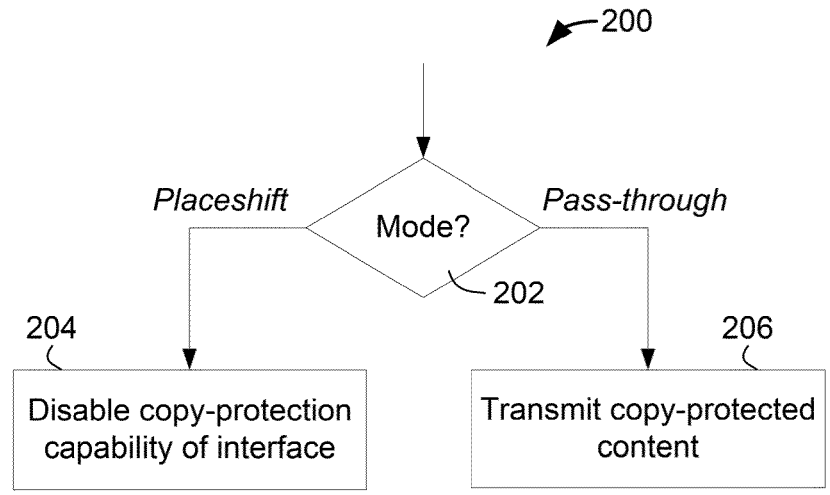
Figure 3:
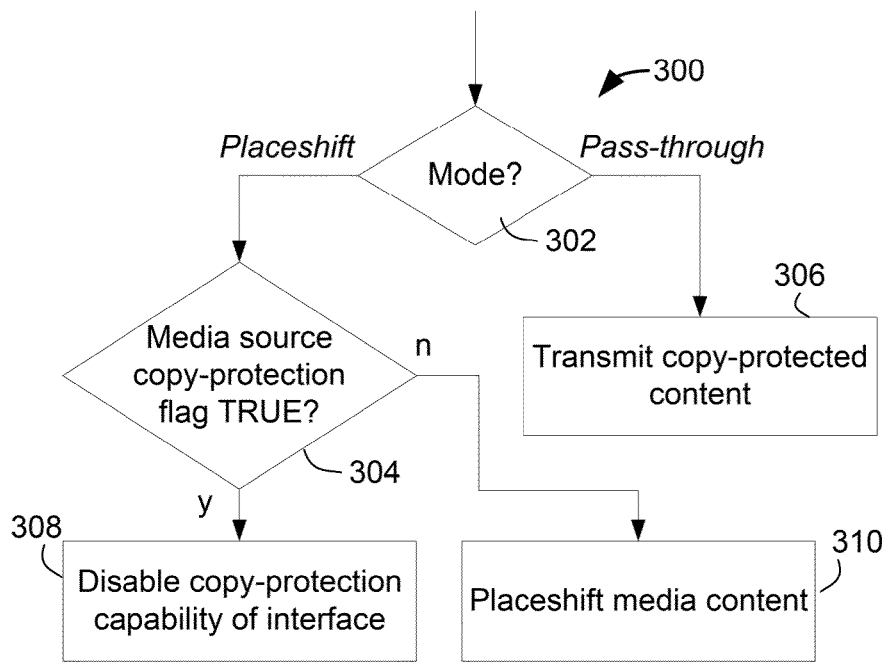
Figure 4:
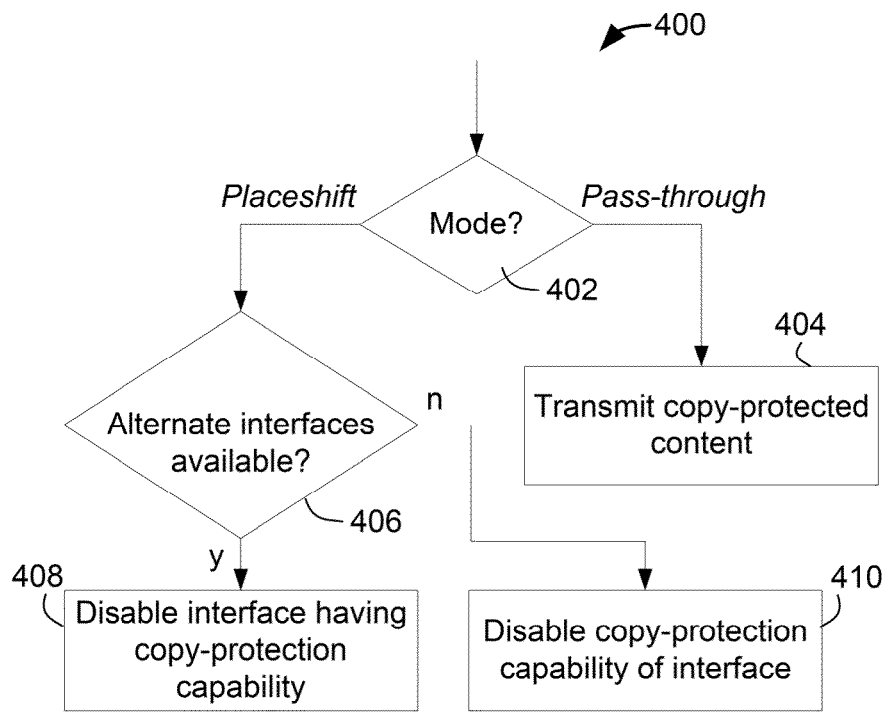

FIGS. 2-4 present flowcharts in accordance with various embodiments of the present invention.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In general, various systems and methods are provided for placeshifting devices configured to handle content from a media source (e.g., a set-top box) that might incorporate a form of copy-protection or other digital rights management technology such as HDCP. In one embodiment, when a placeshifting mode is entered (as opposed to a pass-through mode), the copy-protection capability of the interface (e.g., an HDMI interface) is simply disabled. In another embodiment in which the media source includes a copy protection "flag" or the like that can be interrogated by the placeshifting device, the placeshifting device determines whether the media source copy-protection is enabled, and only then disables the copy-protection capability of the interface. In another embodiment in which selectable output control (SOC) is available in the media source, the placeshifting device determines whether alternate interfaces are available (e.g., component video, composite video, and the like), and if so, disables the interface having copy-protection capability.

Referring now to FIG. 1, an exemplary placeshifting system 100 useful in describing the present embodiments will now be described. As shown a placeshifting system 100 generally includes a placeshifting device 110 that receives media content from one or more media sources 120, encodes the received content into a suitable format (e.g., a streaming format), and then transmits the encoded media stream to a media player 150 over a network 140 (e.g., a WLAN, the Internet, etc.). Media player 150 receives the encoded stream, decodes the stream, and presents the decoded content to a viewer on a television or other such display 160. Similarly, the content may be viewed locally (with respect to placeshifting device 110) via a display 130. In various embodiments, a server 170 may also be provided to communicate with placeshifting device 110 and/or media player 150 via network 140 to assist these devices in locating each other, maintaining security, providing or receiving content or information, and/or any other features as desired.

Media sources 120 (120A, 120B, etc.) may include a wide range of sources now known or later developed, including, for example, broadcast television, cable television, satellite television, "video-on-demand" or similar sources, digital video disk (DVD) players and other removable media, video camera systems, video game consoles, set-top box (STB) systems, Internet media sources (e.g., YouTube), and the like. Media sources 120 will also typically include one or more output interfaces (not illustrated).

Placeshifting device 110 includes any combination of software and/or hardware configured to perform the functionality described herein. In the illustrated embodiment, for example, placeshifting device 110 includes a display interface 111 (coupled to display 1030), a network interface 115 (coupled to network 140), and one or more receiver interfaces 116 (116A, 116B, etc.) coupled to media sources 120. Receiver interfaces 116 include any set of interfaces now known or later developed, such as HDMI, component video, and composite video interfaces. As shown, a particular media source 120 may be coupled to one or more receiver interfaces 116A.

Thus, for example, media source 120A is coupled to both receiver interfaces 116A and 116B, while media source 120B is coupled to receiver interface 116C. A receiver interface 116 may have a selectable capability of receiving and decoding copy-protected media content. For example, in the case of an HDMI/HDCP interface, placeshifting device 110 may disable or enable HDCP compliance on that interface (e.g., by resetting the HDMI interface and refusing HDCP hand-shaking from media source 120).

Placeshifting device 110 includes a user interface module 113 configured to provide interaction between the user and placeshifting device 110 (e.g., via various menus, remote control devices, and other conventional user interface components).

Placeshifting device 110 also includes a controller 112 for coordinating the operation of other components of placeshifting device 110, and suitable storage (e.g., hard disk and/or solid state drives) 114 for storing data received from media sources 120 as well as other data associated with operation of placeshifting device 110. The particular methods described herein may be implemented, for example, using software executable by controller 112, and then presented to the user via display 130 and/or display 160. As described in further detail below, controller 112 has a "placeshifting mode" (during which placeshifting device 110 performs placeshifting) and a "pass-through mode" (during which placeshifting device 110 simply allows media content to pass through— e.g., to display 130).

It will be appreciated that placeshifting device 110 will typically include a number of additional hardware and/or software components (e.g., memory, controllers, digital signal processors, etc.), which have been left out of the illustration in the interest of simplicity. For example, placeshifting device 110 will typically incorporate an encoder and/or transcoder module configured to convert audio/video or other data from media sources 120 into a packetized format that can be transmitted over network 140.

Placeshifting device 110 may also include a transmit buffer module that temporarily stores encoded data prior to transmission over network 140 and adjusts one or more parameters of the encoding (e.g., the bit rate of the media stream) to maintain desirable picture quality and data throughput in view of the then-current network performance. Placeshifting device may also be configured to provide commands to one or more of the media sources 120, e.g., to request a desired input signals from that media source. Such commands may be provided over any convenient wired or wireless interface, such as an infrared or other wireless transmitter that emulates remote control commands receivable by the media source 120. The SLINGBOX® products available from Sling Media, Inc. of Foster City, Calif. are one exemplary placeshifting device.

In some embodiments, placeshifting device 110 incorporates all or a portion of the functionality typically associated with a particular media source 120. For example, placeshifting device 110 might be a hybrid STB or other receiver that provides transcoding and placeshifting features. Such a device may receive satellite, cable, broadcast and/or other signals that encode television programming or other content received from an antenna, modem, server and/or other source. Such devices may also include a content database (stored, for example, within storage 114) to support a personal or digital video recorder (DVR) feature or other content library as appropriate. Stated another way, in some embodiments, media source 120 and placeshifting device 110 are physically and/or logically contained within a common component, housing or chassis.

In some embodiments, placeshifting device 110 is a software application configured to be executed on a conventional computing system (e.g., a personal computer, tablet computer, smartphone, or the like). In such embodiments, placeshifting device 110 may encode some or all of a screen display typically provided to a user of the computing system for placeshifting to media player 150. One device capable of providing such functionality is the SlingProjector® product available from Sling Media, Inc.

Media player 150 may be any device, component, module, hardware, software and/or the like capable of receiving a media stream placeshifting device 110. In various embodiments, media player 150 is a desktop computer, a laptop computer, a tablet computer, a mobile phone, a personal digital assistant, a personal media player (such as the ARCHOS™ products available from the Archos company of Igny, France) or the like. In many embodiments, media player 150 is a general purpose computing device that includes a media player application that is capable of securely connecting to placeshifting device 110 and receiving and presenting media content to the user of the device as appropriate. In other embodiments, media player 150 is a standalone or other separate hardware device capable of receiving the media stream via network 140 and decoding the media stream to provide an output signal that is presented on a television or other display 160. One example of a standalone media receiver 150 is the SLINGCATCHER® product available from Sling Media, Inc., although other products might be used in connection with the subject matter described herein.

As mentioned previously, one or more of interfaces 116 may be configured to receive copy protected media content. In one common example, placeshifting device 110 includes an HDMI interface that is configured to conform to the HDCP standard (e.g., through its well-known handshaking procedure, etc.). In that regard, it may not be legally or technically possible to retransmit copy-protected media content received from a particular media source 120A. That is, in the terms of the HDCP standard, placeshifting device 110 may be considered an HDCP "sink" that is unable to transfer the media content to media player 150 over network 140 in a "placeshifting mode," but may still transmit the media content to display 130 in "pass-through" mode. In many instances (e.g., with HDCP) it is not possible to detect from the media content itself whether the content is encrypted or otherwise copy-protected.

FIGS. 2-4 present various methods of addressing the above issue. In general, these methods involve selectably disabling the copy-protection capability of the interface, or disabling the entire interface itself, based on the nature of media source 120 and whether placeshifting device 110 is in placeshifting mode or pass-through mode.

FIG. 2 depicts an exemplary method 200 applicable, for example, when media source 120 is configured as an "all or nothing" device with respect to copy protection—i.e., media source 120 first determines whether placeshifting device 110 is capable of receiving copy-protected content. If it is, then the media content is transmitted to placeshifting device 110; if not, then the media content is not transmitted. In such as case, placeshifting device 110 first determines whether it is in pass-through mode (step 202). If so, then the copy-protected content is transmitted (e.g., to a television display) (step 206). If not, then the copy-protection capability of the interface is disabled (step 204). For example, in the case of an HDMI/HDCP interface, placeshifting device 110 may disable HDCP on the interface and then reset the HDMI interface altogether. In this way, media source 120 will see that placeshifting device 110 is not capable of receiving HDCP media content, and will thereafter make its own decision as to whether media content should be provided to placeshifting device 110.

FIG. 3 depicts a method 300 applicable, for example, when media source 120 is configured with a copy-protection "flag" or is otherwise capable of being interrogated by placeshifting device 110 to determine whether the content being transmitted is subject to some form of copy protection. In this embodiment, the mode is first determined (step 302). In pass-through mode, the copy-protected content is transmitted (step 306). If not, then placeshifting device 110 determines whether the media source is copy-protected (e.g., by determining whether the copy-protection flag is TRUE). If the media source is copy-protected, then the copy-protection capability of the interface is disabled. If not, then the copy-protected content is transmitted and placeshifted as desired (step 310).

FIG. 4 depicts a method 400 applicable, for example, when media source 120 is a "selectable output control" (SOC) device. As is known in the art, an SOC device is configured to change its output interface based on some form of external command. For example, in the event that placeshifting mode is entered (via step 402), placeshifting device 110 may instruct media source 120 to switch through all available interfaces (e.g., HDMI, component video, composite video, coax and the like) and look for the existence output signal, thereby determining whether alternate interfaces (i.e., alternatives to the copy-protected interface) are available (step 406). If such alternate interfaces are available, then the interface having the copy-protection capability is disabled, and the content is received through one of the alternate interfaces (step 410). If not, then the copy-protection capability of the interface is disabled (step 410). In the HDMI/HDCP case, this might involve disabling the HDMI interface altogether (as though the HDMI cable were effectively unplugged) and receiving the content via a component video interface. In at least one embodiment, the placeshifting device 110 may transmit a command to the media source 120 that indicates the disablement of HDMI interface, such that the media source 120 enables output of the content via an alternative output.

In accordance with the embodiments depicted in FIGS. 2-4, various user interface messages and options may be presented to the user. For example, the user may be instructed to use multiple receiver interfaces during set-up (e.g., "Please connect both HDMI and Component Video cables"). The user might also be notified that a certain media source is being blocked from placeshifting due to copy-protection. In general, the user might be presented with information regarding the copy-protection capability of the various interfaces and/or placeshifting device 110.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A placeshifting device configured to receive media content from a media source, the placeshifting device comprising:
    a controller having a placeshifting mode; and
    a first receiver interface coupled to the controller and the media source, the first receiver interface having a selectable copy-protection capability;
    wherein the controller is configured to:
        disable the copy-protection capability of the first receiver interface when the processor enters a placeshifting mode,
        determine that the media source implements selectable output control;
        determine whether a second receiver interface is coupled to the media source via the selectable output control; and
        disable the first interface if the second receiver interface is coupled to the media source.

2. The placeshifting device of claim 1, wherein the controller is configured to:
    interrogate the media source to determine whether the media source is transmitting copy-protected media content, and
    disabling the copy-protection capability of the first receiver if the media source is transmitting copy-protected media content.

3. The placeshifting device of claim 1, wherein the controller is configured to determine whether the second receiver interface is coupled to the media source by:
    instructing the media source to attempt output of the media content via a plurality of media source interface; and
    determining whether a signal is being received via the plurality of media source interfaces.

4. The placeshifting device of claim 1, wherein the first receiver interface is an HDMI interface.

5. The placeshifting device of claim 4, wherein the copy-protection capability is an HDCP copy-protection capability.

6. The placeshifting device of claim 1, wherein the controller is further configured to provide a message to a user regarding the state of the copy-protection capability.

7. A method for managing an interface between a placeshifting device and a media source, comprising:
    determining whether the placeshifting device is in a pass-through mode or a placeshifting mode;
    disabling a copy-protection capability of the interface when the placeshifting device enters the placeshifting mode;
    enabling the copy-protection capability of the interface when the placeshifting device enters the pass-through mode;
    determining that the media source implements selectable output control;
    determining whether a second receiver interface is coupled to the media source via the selectable output control; and
    disabling the first interface if the second receiver interface is coupled to the media source.

8. The method of claim 7, further including:
    interrogating the media source to determine whether the media source is transmitting copy-protected media content, and
    disabling the copy-protection capability of the first receiver only if the media source is transmitting copy-protected media content.

9. The method of claim 7, further including:
    instructing the media source to attempt output of the media content via a plurality of media source interface; and
    determining whether a signal is being received via the plurality of media source interfaces.

10. The method of claim 7, wherein the first receiver interface is an HDMI interface.

11. The method of claim 7, wherein the copy-protection capability is an HDCP copy-protection capability.

12. The method of claim 7, further including:
    providing a message to a user regarding the state of the copy-protection capability.

13. Non-transitory computer-readable media bearing software instructions configured to instruct a processor to:
- determine whether a placeshifting device is in a pass-through mode or a placeshifting mode;
- disable a copy-protection capability of an interface between the placeshifting device and a media source when the placeshifting device enters the placeshifting mode; and
- enable the copy-protection capability of the interface when the placeshifting device enters the pass-through mode;
- determine that the media source implements selectable output control; and
- determine whether a second receiver interface is coupled to the media source via the selectable output control; and
- disable the first interface if the second receiver interface is coupled to the media source.

14. The non-transitory computer-readable media of claim 13, wherein the software instructions are further configured to instruct the processor to:
- interrogate the media source to determine whether the media source is transmitting copy-protected media content, and
- disable the copy-protection capability of the first receiver only if the media source is transmitting copy-protected media content.

15. The non-transitory computer-readable media of claim 14, wherein the software instructions are further configured to instruct the processor to:
- instruct the media source to attempt output of the media content via a plurality of media source interface; and
- determine whether a signal is being received via the plurality of media source interfaces.

16. The non-transitory computer-readable media of claim 13, wherein
the first receiver interface is an HDMI interface.

17. The non-transitory computer-readable media of claim 13, wherein
copy-protection capability is an HDCP copy-protection capability.

* * * * *